G. H. WHITELEY, Jr.
ARTIFICIAL TOOTH.
APPLICATION FILED JULY 24, 1913.
1,144,336.
Patented June 22, 1915.
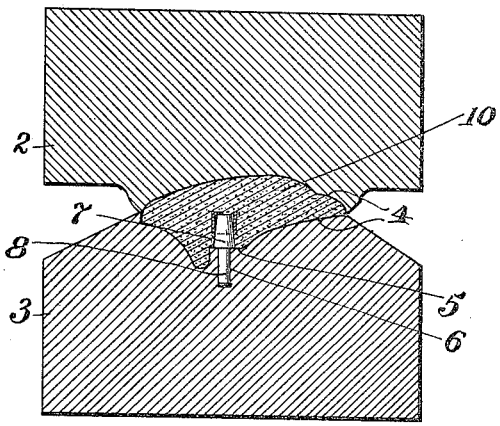
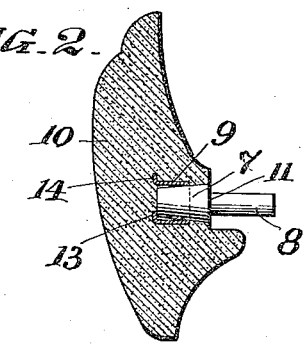
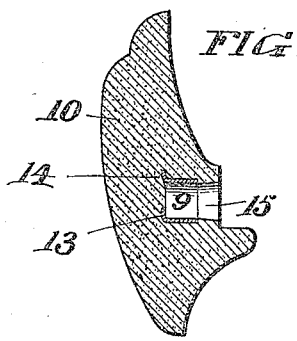
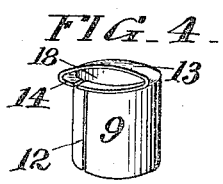
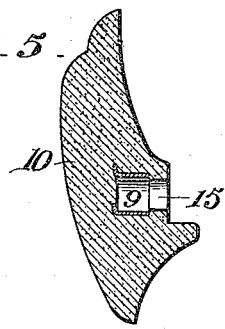
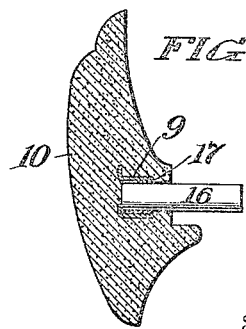
Witnesses
Daniel Webster Jr.
Marie Markley
Inventor
George H. Whiteley Jr.
By
Attorney

UNITED STATES PATENT OFFICE.

GEORGE H. WHITELEY, JR., OF YORK, PENNSYLVANIA.

ARTIFICIAL TOOTH.

1,144,336. Specification of Letters Patent. Patented June 22, 1915.

Application filed July 24, 1913. Serial No. 780,905.

*To all whom it may concern:*

Be it known that I, GEORGE H. WHITELEY, Jr., citizen of the United States, and resident of York, county of York, and State of Pennsylvania, have invented an Improvement in Artificial Teeth, of which the following is a specification.

My invention has for its object an improved construction of artificial teeth and more particularly the anchoring for soldered pin teeth, which operates to make a strongly attached pin and to facilitate the manufacture of the teeth and thereby reduce the cost.

My invention consists of an artificial tooth having therein an anchor formed of a tube or "coil," preferably split, made with its inner end bent transversely, to provide a metal foundation for the pin and a lateral anchoring flange embedded in the porcelain body of the tooth.

My invention further consists in a tooth of the character above specified having a pin soldered into the anchor, preferably both upon its sides and bottom.

My invention also comprises the specific construction of the anchor having the split body wall and transversely bent end portion, as more fully described hereinafter.

My improvements also comprehend features which are defined in the claims and which, together with those above specified, will be better understood by reference to the drawings.

In the drawings, Figure 1 is a cross section of a mold, showing the process of molding my improved tooth with anchor upon the removable post; Fig. 2 is a sectional elevation of a molded tooth with anchor and post as it is removed from the mold; Fig. 3 is the same structure as shown in Fig. 2 with the post removed; Fig. 4 is a perspective view (on a large scale) of my improved anchor; Fig. 5 is a similar sectional view to Fig. 3, but showing the structure after firing; and Fig. 6 in a sectional view of the structure of Fig. 5 with the pin soldered in position.

My improved tooth and anchor therein, shown in Fig. 5, before the attachment of the pin, is formed by molding the bisque tooth body upon the anchor, and this will be understood by reference to Fig. 1. Briefly, 2 and 3 are the two mold parts respectively having the recesses 4 to provide the tooth space in which the bisque tooth 10 is molded. During this molding operation the anchor 9 is supported within the tooth space by a post 7 having a shank 8 loosely fitting a hole 6 in the surface 5 of one of the mold parts, the post having preferably a shoulder 11 to support it in position. When molded, the bisque tooth with the pin is removed from the mold (Fig. 2) and the subsequent withdrawal of the post leaves a hole or opening 15 into the tooth, termination in the anchor (Fig. 3), in which condition the tooth is fired to vitrify it (Fig. 4), ready for the pin 16 to be soldered into the anchor.

The anchor 9 consists of a tubular shell or coil, preferably split as at 12 and having one end flanged outwardly as at 14 and inwardly as at 13 (Fig. 4). This anchor is preferably made of a strip of platinum or other metal, fusible only at high temperature, namely above that required for vitrifying or burning the bisque material of the tooth. The strip of platinum is coiled into cylindrical or tubular form, as indicated at 9, and the longitudinal edges are free to form the slit or small gap 12 to allow of expansion or contraction due to changes of temperature. The coil at one end, has the edge at one side bent laterally inward, at 13, to form a part closure to the end of the anchor and to provide a shoulder on the anchor to rest upon the end of the post 7, as shown in Figs. 1 and 2, and on the other side the platinum edge is bent laterally outward, as at 14, to form a flange which becomes embedded in the bisque during the molding and firmly holds anchor in place in the tooth. It is immaterial as to the particular shape of the parts 13 and 14, the particular form shown, however, being that which I have found satisfactory in practice, and conveniently and cheaply made.

The special construction of the anchor provides the following advantages: The end of the post will directly receive the flange 13 to hold the anchor above the bottom of the mold space, and the said flange will also partly close the open bottom end 18 of the anchor. The other or open end of the anchor fits the body of the post and thereby centralizes it and prevents the bisque material being forced into the anchor during the molding operation, and by reason of supporting of the anchor upon the end of the post, the body of the latter may be of a continuous surface (as no shoulder will be required), and the bisque material may be packed in under the lower edge of the anchor (Figs. 1 and 2), and thereby firmly lock the anchor in the tooth body and also insure the pin 16, which is subsequently soldered in, fitting snugly the entering hole 15 leading to the anchor.

It will be seen from Fig. 3 that the bisque walls of the hole 15 extend under the edge of the anchor. In the firing operation, the bisque materials swell somewhat and then contract slightly on cooling. When it is fired, the hole 15 becomes somewhat smaller in diameter, approximating the diameter of the pin 16 to be inserted. This reduction of the hole 15 by the expansion or swelling of the bisque on firing, is indicated in Fig. 5. The tooth is now ready for having the pin secured in place. The anchor forms metal walls and metal bottom to which to solder the pin; and this is accomplished by inserting a small piece of solder and then the pin, and subjecting the tooth to a temperature sufficient to melt the solder. The solder unites the pin to the walls and bottom of the anchor, and fills the space between the pin and walls of the anchor, as indicated at 17 in Fig. 6, the quantity of solder in this figure being exaggerated to make its presence more readily seen.

The contracting of the hole 15, in the manner above described, to closely fit the pin 16, insures a better closure to the solder, and in this way protects the solder from being attacked by acid or strong alkaline solutions or substances which might find their way to the tooth structure in use, or in the use of the tooth during the course of manufacture of a plate or bridge for the mouth. The pin 16 may be made with or without a head, as desired.

The shape of the tooth *per se* is immaterial, and may be varied just as the teeth of the mouth vary in shape.

In this application no claim is made to the particular construction of the mold and the supporting pin or post for the anchor, nor to the method employed in the manufacture of the tooth, as these form subject matter of my application Ser. No. 774,288, filed June 18, 1913; such reference to the said method and molding means as has been made in this application being solely for the purpose of indicating how the tooth structure with its anchor is formed with a contracted hole in the porcelain for the proper reception of the pin which is soldered in position.

Having now described my improvements, what I claim as new and desire to secure by Letters Patent, is:—

1. As an article of manufacture, an artificial tooth having embedded therein a metal anchor of tubular form having at the inner end a laterally extending inwardly directed flange to partly close the tubular opening through the bottom of the anchor and also having a lateral flange extending outwardly from the anchor and embedded in the tooth body.

2. An artificial tooth which consists of a vitreous body having embedded therein a metal anchor consisting of a tubular part having at its bottom lateral flange portions one flange outwardly extending and the other flange inwardly extending over the end of the anchor and the vitreous body having a hole leading through its outer wall into the tubular space within the anchor and of a less cross section than the cross section of the tubular opening into the anchor, combined with a pin extending through the hole in the vitreous body and soldered at its inner end to the side walls and the inward lateral flange of the anchor.

3. An anchor for a soldered pin tooth, which consists of a tubular body of metal having one end flanged laterally inward partly over the tubular opening of the anchor to form a closure therefor and having the other portion of the same end flanged laterally outward.

4. An anchor for a soldered pin tooth, which consists of a longitudinally split tubular body of metal having one end crushed transversely and flattened to form a flanged end, a portion of which acts as closure to the tubular opening of the anchor and the remaining portion extends as a flange directed away from the outer surface of the anchor body.

In testimony of which invention, I hereunto set my hand.

GEORGE H. WHITELEY, Jr.

Witnesses:
HARRY S. EBERT,
J. O. WHITELEY.